United States Patent
Schulz et al.

(10) Patent No.: US 6,528,964 B2
(45) Date of Patent: Mar. 4, 2003

(54) METHOD AND SYSTEM OF REDUCING TURN-OFF LOSS AND NOISE IN A SWITCHED RELUCTANCE MOTOR DRIVE

(75) Inventors: Steven E. Schulz, Redondo Beach; Khwaja M. Rahman, Torrance, both of CA (US)

(73) Assignee: General Motors Corporation, Detroit, MI (US)

( * ) Notice: Subject to any disclaimer, the term of this patent is extended or adjusted under 35 U.S.C. 154(b) by 36 days.

(21) Appl. No.: 09/804,557

(22) Filed: Mar. 12, 2001

(65) Prior Publication Data

US 2002/0153858 A1 Oct. 24, 2002

(51) Int. Cl.[7] .................................................. H02D 7/36
(52) U.S. Cl. ........................ 318/701; 318/138; 318/254; 318/432; 318/434; 318/720; 318/721; 318/722; 318/724
(58) Field of Search ................................ 318/138, 439, 318/254, 701, 432, 720, 721, 722, 724, 434

(56) References Cited

U.S. PATENT DOCUMENTS

| | | | | |
|---|---|---|---|---|
| 3,560,820 A | * | 2/1971 | Unnewehr | 318/139 |
| 4,595,865 A | * | 6/1986 | Jahns | 318/254 |
| 4,684,867 A | * | 8/1987 | Miller et al. | 318/701 |
| 5,381,081 A | * | 1/1995 | Radun | 322/94 |
| 5,703,457 A | * | 12/1997 | Davis | 318/701 |
| 5,945,801 A | * | 8/1999 | Yamada et al. | 318/701 |
| 6,054,819 A | * | 4/2000 | Pengov | 318/254 |
| 6,078,161 A | * | 6/2000 | Kim et al. | 318/701 |
| 6,087,799 A | * | 7/2000 | Turner | 318/701 |
| 6,137,256 A | * | 10/2000 | Morris | 318/701 |

OTHER PUBLICATIONS

Publication entitled, "New Soft–Switched/Switched–Reluctance Motor Drive Circuit," (Authors, Yoshihiro Murai, Senior Member, IEEE, Ji Cheng, Masaharu Yoshida; IEEE Transactions on Industry Applications, vol. 35, No. 1, Dated Jan.–Feb. 1999, pp. 78–85).

Publication entitled, "Analysis and application of a part resonant circuit for switched reluctance motor," (Authors, Ji Cheng, Masaharu Yoshida, Yoshihiro Murai, Dept. of Electrical & Electronics Eng. Gifu University, Dated ©1999 IEEE, pp. 1115–1120).

Publication entitled, "A Capacitor–Boosted, Soft–Switched Switched–Reluctance Motor Drive," (Authors, Yoshihiro Murai, Ji Cheng, S. Sugimoto, M. Yoshida, Dept. of Electrical & Electronics Eng. Gifu University, Dated ©1999 IEEE, pp. 424–429).

Publication entitled, "A Simple Soft–Switched Switched–Reluctance Motor Drive," (Authors, Yoshihiro Murai and Ji Cheng, Dept. of Electrical & Electronics Eng. Gifu University, Dated 1998 IEEE, pp. 911–916).

(List continued on next page.)

Primary Examiner—Robert E. Nappi
Assistant Examiner—Tyrone Smith
(74) Attorney, Agent, or Firm—Christopher DeVries

(57) ABSTRACT

An inverter for use in a switched reluctance (SR) motor drive is provided. The inverter comprises a first and second transistor for selectively providing current to an SR motor winding. A resonant-type snubber circuit is connected to the transistors to reduce turn-off loss. The snubber circuit includes a pair of diodes, a capacitor, and an inductor. The snubber circuit is reset during switch-on time of the transistors. At transistor turn-off time, the snubber circuit uses the capacitor to effectively limit the rate of change of voltage across the transistors. This allows the transistors to turn off with lower losses, and can also reduce the acoustical noise generated by the motor drive.

8 Claims, 12 Drawing Sheets

OTHER PUBLICATIONS

Publication entitled, "New Soft–Switched Reluctance Motor Drive Circuit," (Authors, Yoshihiro Murai, J. Cheng, and M. Yoshida, Dept. of Electrical & Electronics Eng. Gifu University, IEEE Industry Applications Society, Annual Meeting, New Orleans, Louisiana, Dated Oct. 5–9, 1997, ©1997 IEEE, pp. 676–681).

Publication entitled, "A Soft–Switched Reluctance Motor Drive Circuit with Improved Performances," (Authors, Yoshihiro Murai, J. Cheng, M. Yoshida, Dept. of Electrical & Electronics Eng. Gifu University, Dated ©1997 IEEE, pp. 881–886).

* cited by examiner

US 6,528,964 B2

1

METHOD AND SYSTEM OF REDUCING TURN-OFF LOSS AND NOISE IN A SWITCHED RELUCTANCE MOTOR DRIVE

FIELD OF THE INVENTION

The present invention relates to turn-off loss and noise reduction techniques for electric motors, and, more particularly, to a method and system of reducing turn-off loss and noise in a switched reluctance motor drive.

BACKGROUND OF THE INVENTION

Due to unipolar and phase decoupled operation of a switched reluctance (SR) motor, SR inverters are generally different in architecture than the standard totem pole or half-bridge voltage source inverters which are used for induction motors, permanent magnet alternating current motors and other machines. There are half-bridge voltage source inverters that can be utilized to reduce the switching losses. Some examples of the half-bridge voltage source inverter improvements include the auxiliary commutated resonant pole inverter, the zero current transition family of inverters, the zero voltage transition family of inverters and the resonant DC link inverters. However, relatively few circuit topologies have been proposed for the reduction of losses in the SR inverters.

The SR inverter typically uses hysteretic control, or "current chopping" to regulate the current of the machine at low to medium speeds. At high speeds, the phase is only switched on and off once per electrical period of the machine. Switching losses are incurred at each of the switching transitions. When insulated gate bipolar transistor (IGBT) type devices are employed, the turn off losses are often large due to the tail current at turn off of these devices. Also, to achieve high current-loop bandwidth, which is often required for good performance of the SR inverter, the switching frequency should be as high as possible. Since the switching losses are proportional to switching frequency, a compromise is often made between bandwidth and power losses.

The two primary forms of current chopping, "hard chopping" and "soft chopping," are often implemented in SR motor inverters, including those inverters similar to the prior art three-phase SR motor inverter 38, as illustrated in FIG. 1. In hard chopping, both the upper and lower switches supplying a certain phase winding (illustrated in FIG. 1 as switches 48, 50 for the first phase winding 51; switches 52, 54 for the second phase winding 53; and switches 56, 58 for the third phase wind 55) are turned on and off (i.e., chopped), simultaneously. In soft chopping, one switch (e.g., 48, 52, 56) is kept on at all times, while the other switch (e.g., 50, 54, 58) is chopped. As compared with soft chopping, hard chopping provides for a greater level of control of the phase current. However, with known inverters, hard chopping has a lower efficiency, primarily due to additional switching power losses, higher ripple current and lower power factor. Soft chopping, although it provides for higher efficiency, less ripple current, and higher power factor cannot be implemented during regenerative braking.

A major concern with switched reluctance motors is acoustic noise generation. Acoustic noise is primarily generated at the turn-off commutation of each phase. Some prior art techniques have employed voltage smoothing at the turn-off commutation to reduce noise. This requires pulse width modulation (PWM) operation of the switches to gradually reduce the voltage applied to the phase winding.

2

As such, this technique of noise reduction is limited to inverters with PWM capability, and may introduce additional losses. Very low cost inverters capable of single pulse mode operation cannot take advantage of this prior art noise reduction technique.

Accordingly it is desirable to have an improved method and system for reducing turn-off loss and noise in a switched reluctance motor drive.

SUMMARY OF THE INVENTION

One aspect of the present invention comprises an inverter for use in a switched reluctance (SR) motor drive. The inverter can be connected to a DC power supply, and for each motor winding, can include a first transistor and a second transistor for selectively providing current to a motor winding. A resonant-type snubber circuit is connected to the transistors to reduce turn-off loss. The snubber circuit is reset during switch-on time of the transistors. At switch turn-off, the snubber circuit uses a capacitor to effectively limit the voltage rate of change across the transistors. This allows the transistors to turn off with lower losses.

Another aspect of the present invention comprises a method of reducing turn-off loss in a switched reluctance motor drive. According to the method, a lossless turn-off switched reluctance inverter is provided. The lossless turn-off switched reluctance inverter includes at least one insulated gate bipolar transistor (IGBT) and a capacitor. The capacitor is coupled to each of the IGBTs. The capacitor is then charged while each of the IGBTs is turned on. Each of the IGBTs is then turned off. The voltage rate of change across each of the IGBTs at turn off is limited by the capacitor.

Another aspect of the present invention comprises a method of reducing acoustic noise in a switched reluctance motor drive. According to the method, a soft-commutation switched reluctance inverter is provided. The soft-commutation switched reluctance inverter includes at least one IGBT and a capacitor. The capacitor is coupled to each of the IGBTs. The capacitor is then charged while each of the IGBTs is turned on. Each of the IGBTs is then turned off. Finally, the voltage rate of change across the motor winding is limited by the capacitor.

DETAILED DESCRIPTION OF THE PRESENTLY PREFERRED EMBODIMENTS

Figure 1:
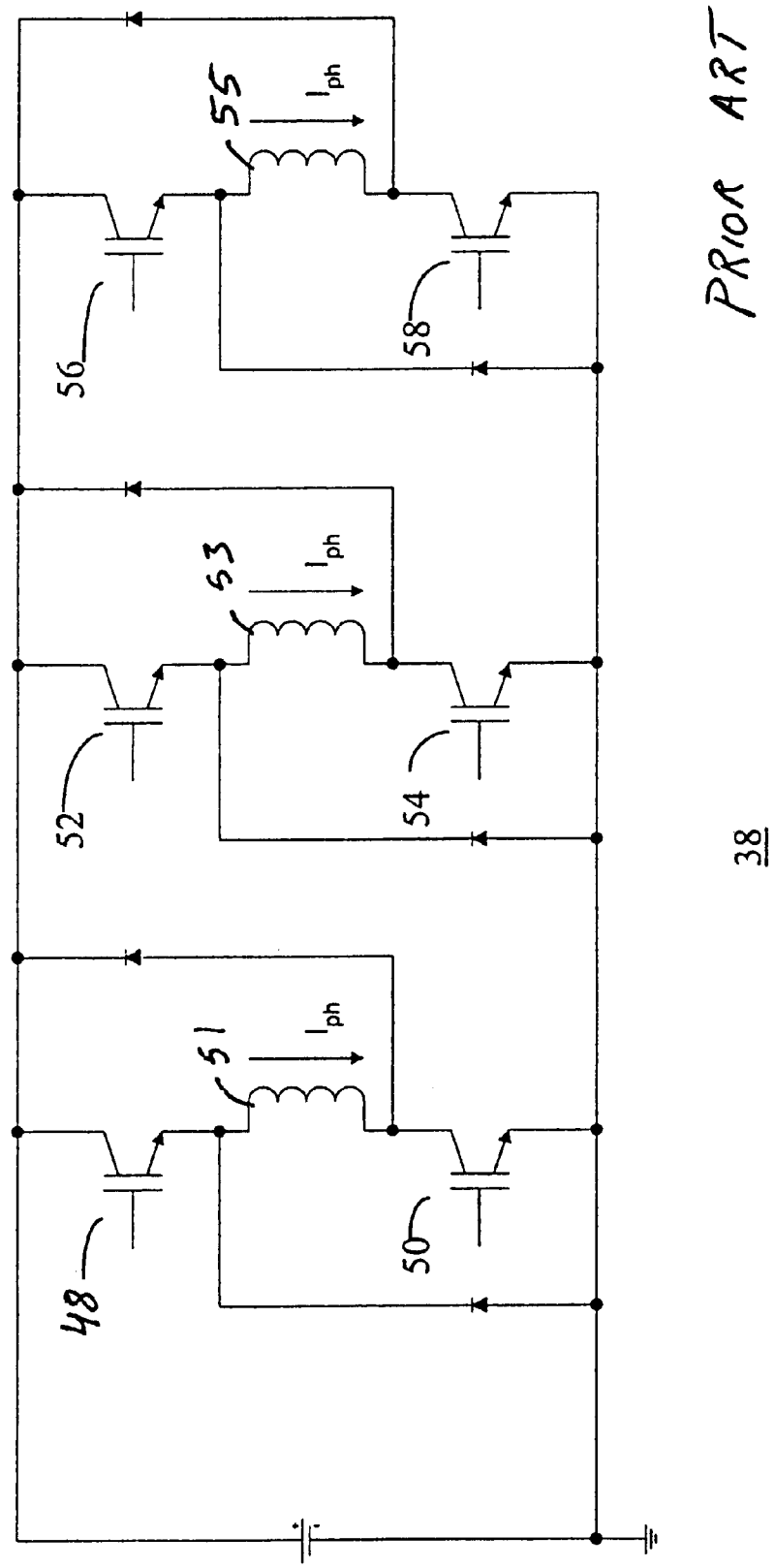
FIG. 1 illustrates a prior art three-phase switched reluctance inverter.
Figure 2:
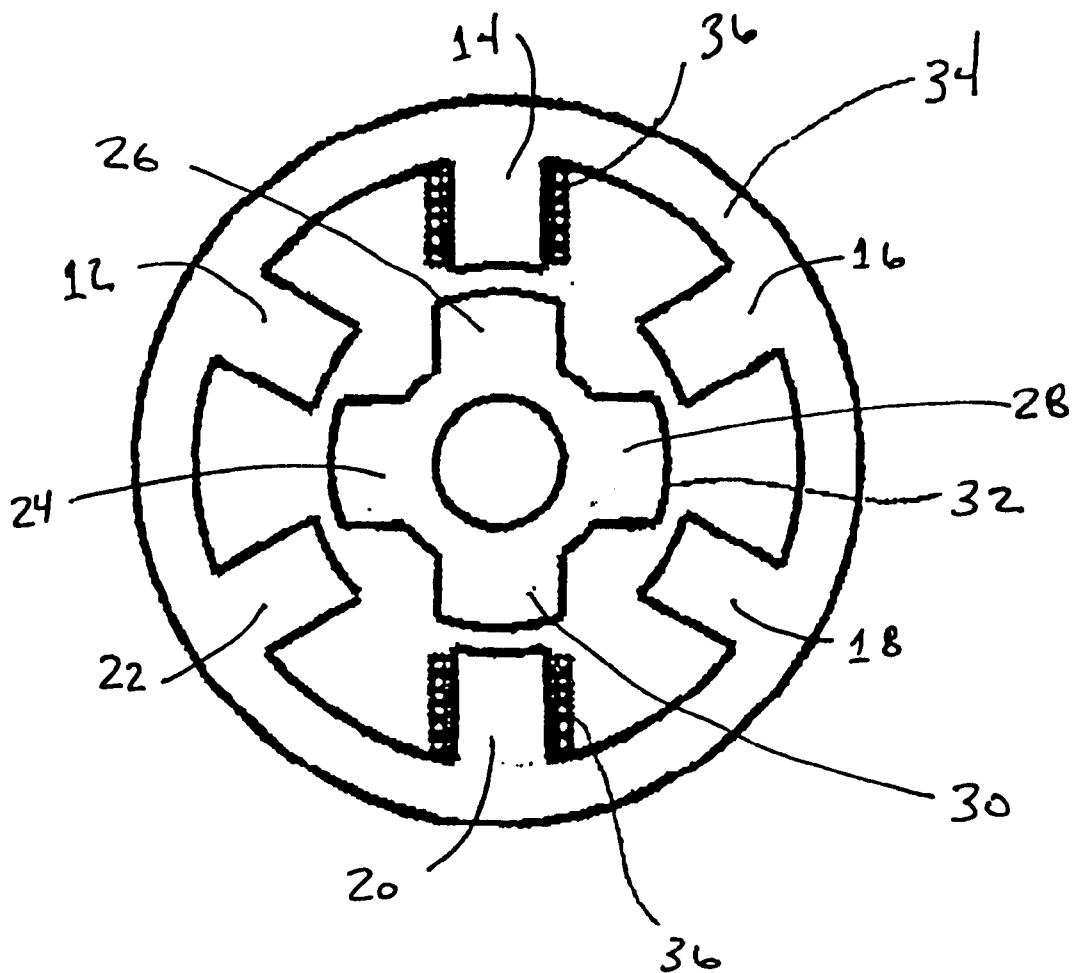
FIG. 2 illustrates a cross-sectional view of a three-phase switched reluctance motor drive.

FIG. 2 illustrates a cross-sectional view of a conventional three-phase switched reluctance (SR) motor 10. SR motor 10 is shown having six stator poles 12, 14, 16, 18, 20, 22, and four rotor poles 24, 26, 28, 30. However, the present invention may be applicable to various types of SR motors having a varying number of stator poles and a varying number of rotor poles. SR motor 10 includes rotor 32. Rotor 32 is rotatable within stationary stator 34. Stator 34 is provided as shown with three pairs of diametrically opposed salient stator poles, paired as follows: 12–18, 14–20 and 16–22. Each stator pole pair 12–18, 14–20, 16–22 protrudes from stator 34 towards rotor 32. Rotor 32, likewise, is provided as shown with two pairs of diametrically opposed salient rotor poles, paired as follows: 24–28 and 26–30. Each rotor pole pair 24–28, 26–30 protrudes from rotor 32 towards stator 34. The opposing poles of each stator pole pair 12–18, 14–20, 16–22 share a common winding and, additionally, define a respective stator phase. In FIG. 2, as shown, winding 36 is wound about stator pole pair 14–20. Similar windings are provided (though not shown) for each of the other stator pole pairs 12–18, 16–22.

Torque in SR motor 10 is produced in accordance with the tendency of rotor 32 to move to a position where the inductance of the windings represents a maximum value. As such, for the production of motor torque during the operation of SR motor 10, a stator phase may be excited during the time in which the phase inductance is increasing with the position of the rotor. Conversely, for regenerative braking torque, the stator phase is excited during the time in which the phase inductance is decreasing with the position of the rotor. During the motor operation mode, each stator phase is initially excited close to the point where the inductance of the winding is near its minimum value. Additionally, each stator phase is unexcited (or commutated to "off") close to the point where the inductance of the winding is near its maximum value. The opposite is true for the regenerative braking case. The magnetic reluctance to the flux of a certain phase of the SR motor 10 is at its lowest point when a rotor pole pair 24/28 or 26/30 is exactly aligned with the corresponding stator pole pair 12/18, 14/20, or 16/22. Conversely, the magnetic reluctance of the flux of a certain phase of the SR motor 32 is at its highest point when a rotor pole pair 24/28 or 26/30 is at an unaligned position. Thus, for example, during a given phase, if rotor pole pair 24/28 or 26/30 is not aligned with an excited stator pole pair 12/18, 14/20, or 16/22, rotor pole pair 24/28 or 26/30 will tend to move to be in alignment with an excited stator pole pair 12/18, 14/20, or 16/22.

To rotate rotor 32, current is switched on and off in each stator phase winding 36 in a predetermined sequence. The switching process is synchronized with the position of rotor 32. The direction of rotation of rotor 32 is independent of the direction of the current flowing through the phase winding 36 during the excitation phase. Thus, to effectively operate SR motor 10, the magnitude and the duration of the current flowing in the stator phase winding 36 must be controlled.

Figure 3:
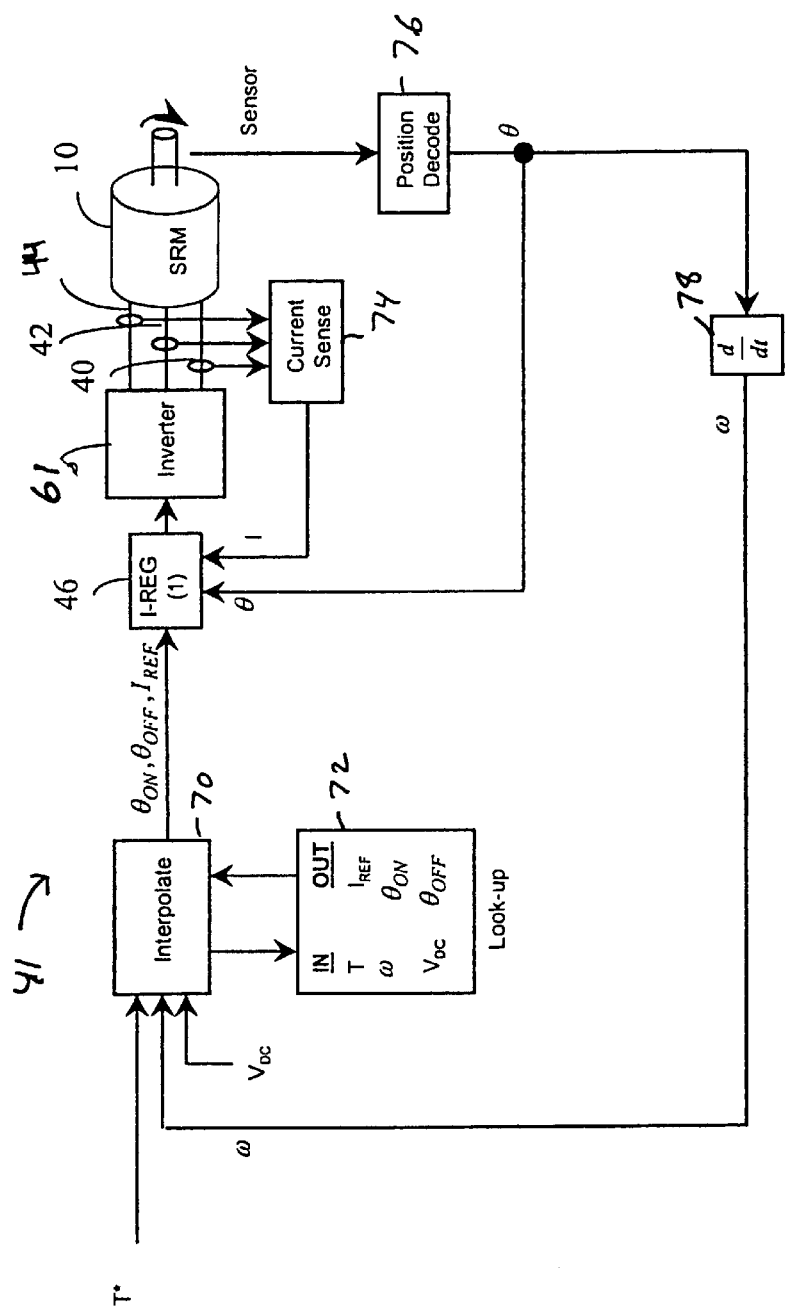
FIG. 3 illustrates a block diagram of a motor controller three-phase switched reluctance motor drive of FIG. 2.

FIG. 3 illustrates a block diagram of a motor control circuit 41 for SR motor 10. The control circuit 41 includes a current regulator (I-REG) 46, an inverter 61, an interpolation circuit 70, a look-up table 72, a current sensor 74, a position decoder 76, and an angular velocity calculator 78.

Referring to FIGS. 2–3, motor winding 36 in SR motor 10 is connected in series with inverter leg 40 as is shown in FIG. 2. The other two motor windings (not shown in FIG. 2) in SR motor 10 are connected in series with inverter legs 42, 44.

In the motor controller 41, when the speed of SR motor 10 is high, the parameters used to control SR motor 10 are phase turn-on angle, $\theta_{ON}$, and phase turn-off angle, $\theta_{OFF}$. At a low speed of operation of SR motor 10, the control parameters are phase turn-on angle, $\theta_{ON}$, phase turn-off angle, $\theta_{OFF}$ and reference current, $I_{REF}$. Additionally, at low speeds, because the back emf is lower than the bus voltage, $V_{DC}$, it is necessary, in addition to controlling the phase turn-on and turn-off angles, $\theta_{ON}$ and $\theta_{OFF}$, respectively, to limit the reference current, $I_{REF}$. Current limitation is preferably accomplished in the by designing the current regulator (I-REG) 46 to regulate the reference current, $I_{REF}$, using known techniques of chopping the current.

Figure 4:
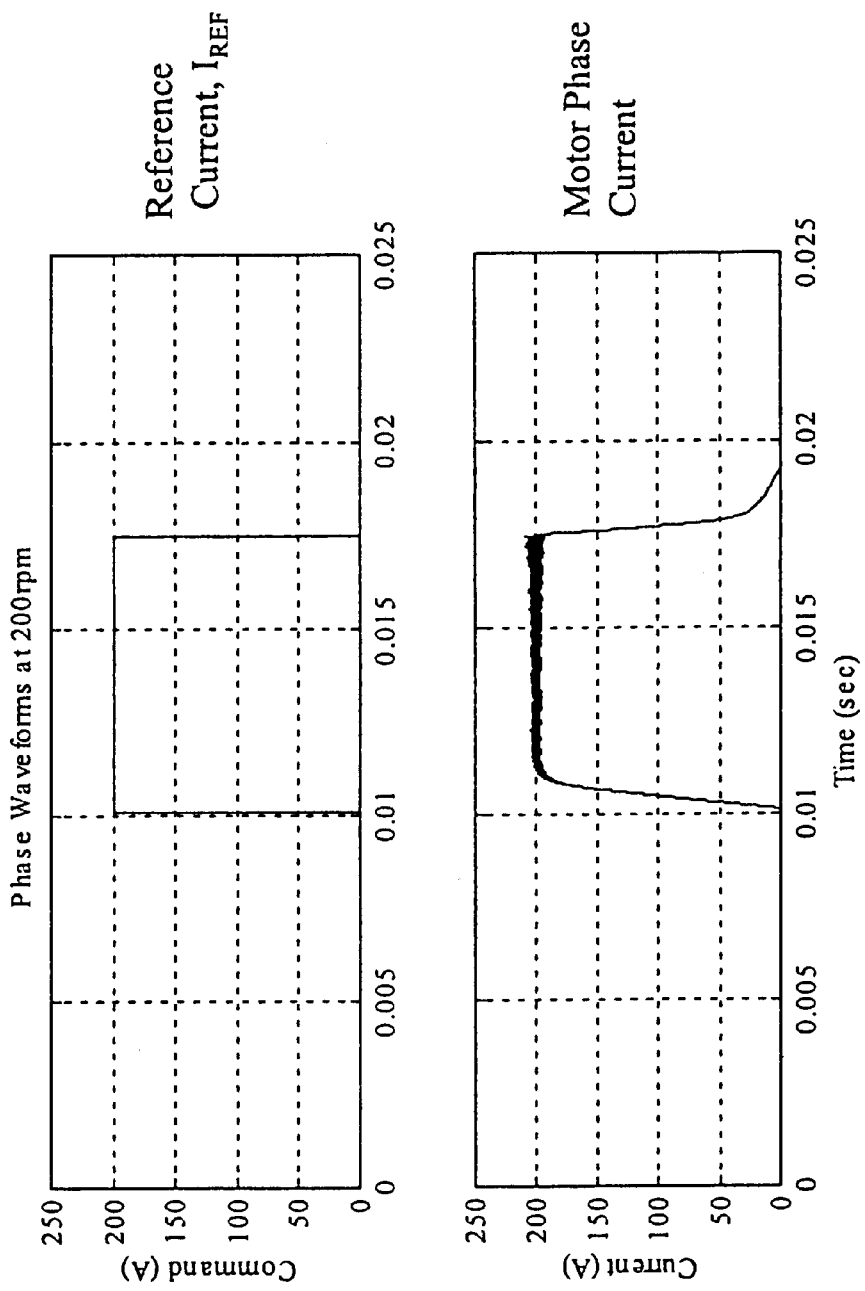
FIG. 4 illustrates a graph of an exemplary reference current and a corresponding motor phase current produced by the motor controller of FIG. 3.

The reference current, $I_{REF}$, at a lower speed of operation of SR motor 10, takes the shape of a square wave. The leading and trailing edges of the square wave define the phase turn-on and turn-off angles, $\theta_{ON}$ and $\theta_{OFF}$, respectively, while the amplitude is the current reference, $I_{REF}$. In response to this reference current, $I_{REF}$, a current regulator, I-REG, turns on with full bus voltage, $V_{DC}$, when the leading edge (i.e., the turn-on angle, $\theta_{ON}$) of the current reference, $I_{REF}$, is encountered. The current reference, $I_{REF}$, is then maintained with the chopping of the phase current, as described above. When the trailing edge of the reference current, $I_{REF}$, is reached, the phase is turned off with a full negative bus voltage, $-V_{DC}$. The reference current, $I_{REF}$, as well as a typical motor phase current in accordance with this control mode, is shown in FIG. 4.

Figure 5:
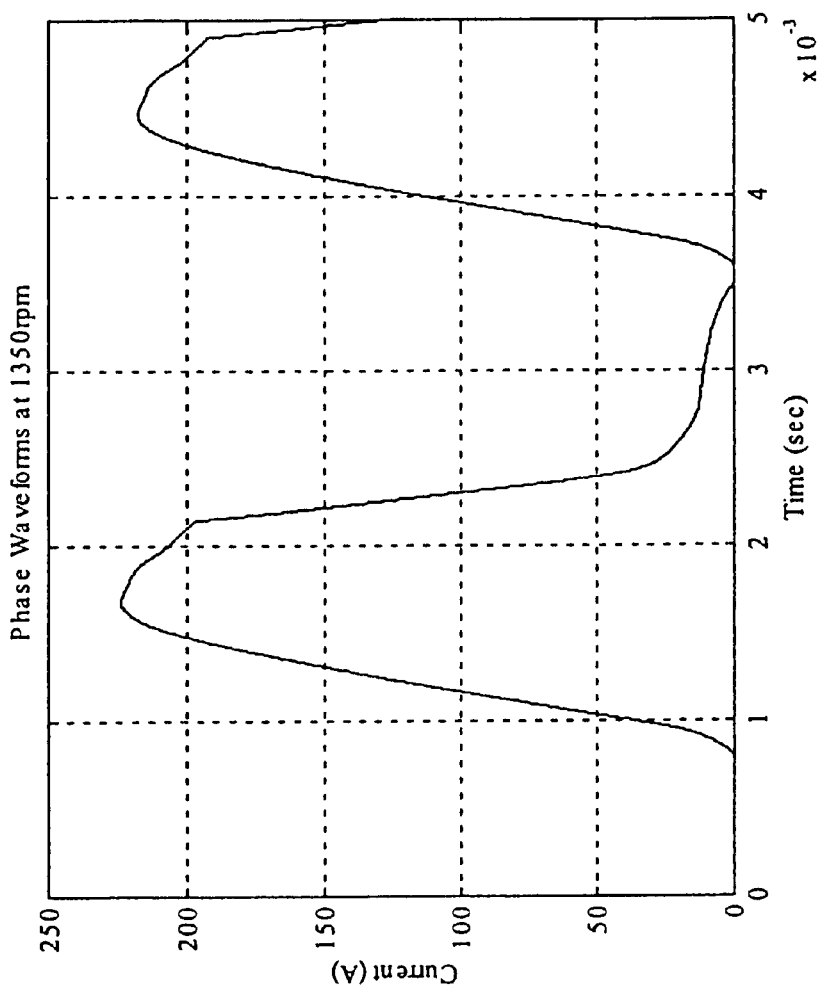
FIG. 5 illustrates a graph of an exemplary motor current generated by the controller of FIG. 3 in the single pulse mode.

At high speed, the back emf is higher than the bus voltage, $V_{DC}$. No current regulation chopping is used at high speeds, and the control is referred to as a "single-pulse" mode. The control parameters at high speed are, therefore, only the phase turn-on and turn-off angles, $\theta_{ON}$ and $\theta_{OFF}$, respectively. In order to build current against a high back emf, the phase turn-on, $\theta_{ON}$, is advanced. This allows current to build before the back emf starts to develop. The high phase inductance, of SR motor 10 holds the current for a sufficiently long time against the high back emf, so that torque can be produced. When the turn-off angle, $\theta_{OFF}$, is reached, the phase is turned off with the full negative bus voltage, $-V_{DC}$. The motor current in this control mode is shown in FIG. 5. In this mode, there is no chopping or reference current, $I_{REF}$. Both at high speed and at low speed there exists an infinite set of control parameters that can produce a certain torque at a certain speed. However, there additionally exists a unique set of control parameters, such as those described above, that can maximize certain performance indices, such as, for example, efficiency. Noise is mostly produced both in the low speed and in the high-speed operations of SR motor 10 during the phase turn-off stage.

The high di/dt (i.e., the rate of change of current) produced by the high bus voltage, $V_{DC}$, during phase turn-off sets up vibration in the stator back iron, thus generating noise.

Figure 6:
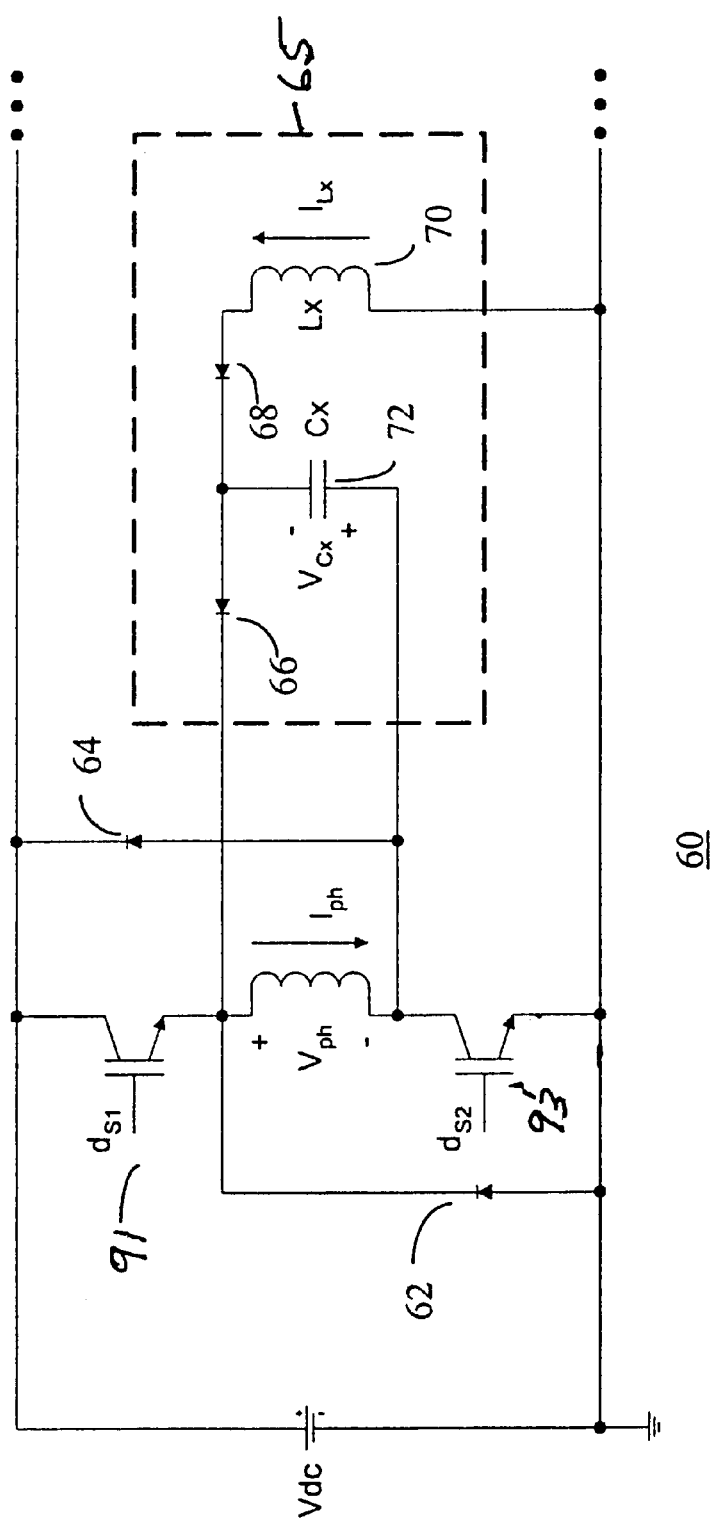
FIG. 6 illustrates a schematic diagram of a single phase of a switched reluctance inverter in accordance with the present invention.

FIG. 6 illustrates a schematic diagram of a single phase of an SR inverter circuit 60 in accordance with the present invention. The inverter circuit 60 can be duplicated for each additional phase of a motor, and included in the inverter 61 of FIG. 3.

Both the upper switch 91 and the lower switch 93 possess the ability to be turned off simultaneously. If the rate of change of the voltage (i.e., dv/dt) applied to the phase at turn-off can be limited, then the turn-off losses in both the upper and lower switches 91, 93 can be reduced. This permits useful implementation of a turn-off circuit (per each individual phase). In turn, this reduces the turn-off loss in both upper and lower active switches 91, 93. Additionally, phase winding 36 is excited with both full positive and full negative $V_{DC}$ in one switching cycle. The negative phase voltage after turn-off permits reset of the turn-off circuit during the next cycle.

Figure 7:
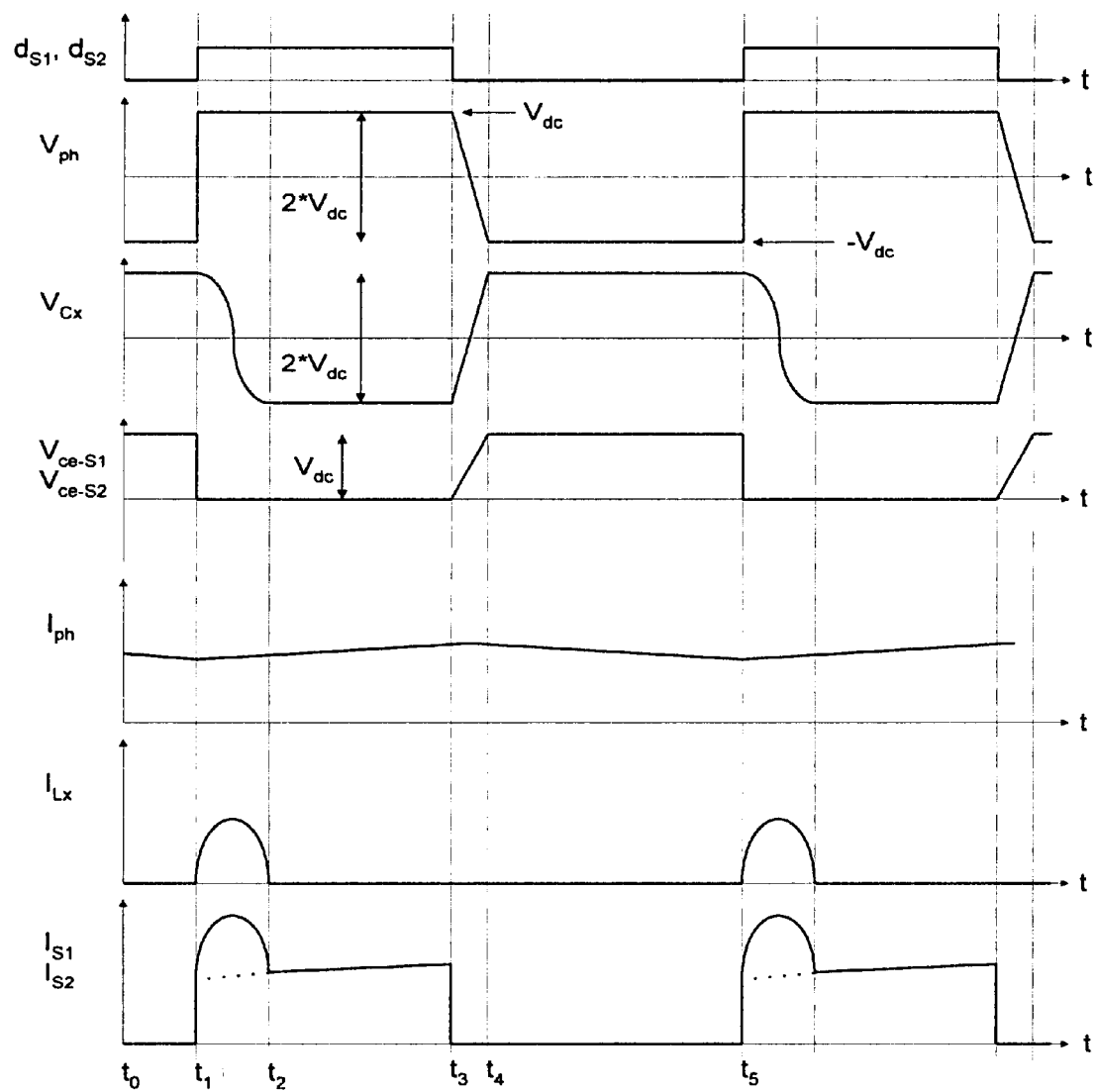
FIG. 7 illustrates a graph of voltage and current waveforms describing the operation of the switched reluctance inverter of FIG. 6.

The snubber circuit components of the SR inverter 60 for achieving the objects of the present invention are shown in the dashed box 65. FIG. 7 illustrates the waveforms resulting from the operation of the SR inverter 60 of FIG. 6. Finally, FIG. 8 illustrates a flow chart of a method of reducing turn-off loss in a switched reluctance motor drive, in accordance with the present invention.

Figure 8:
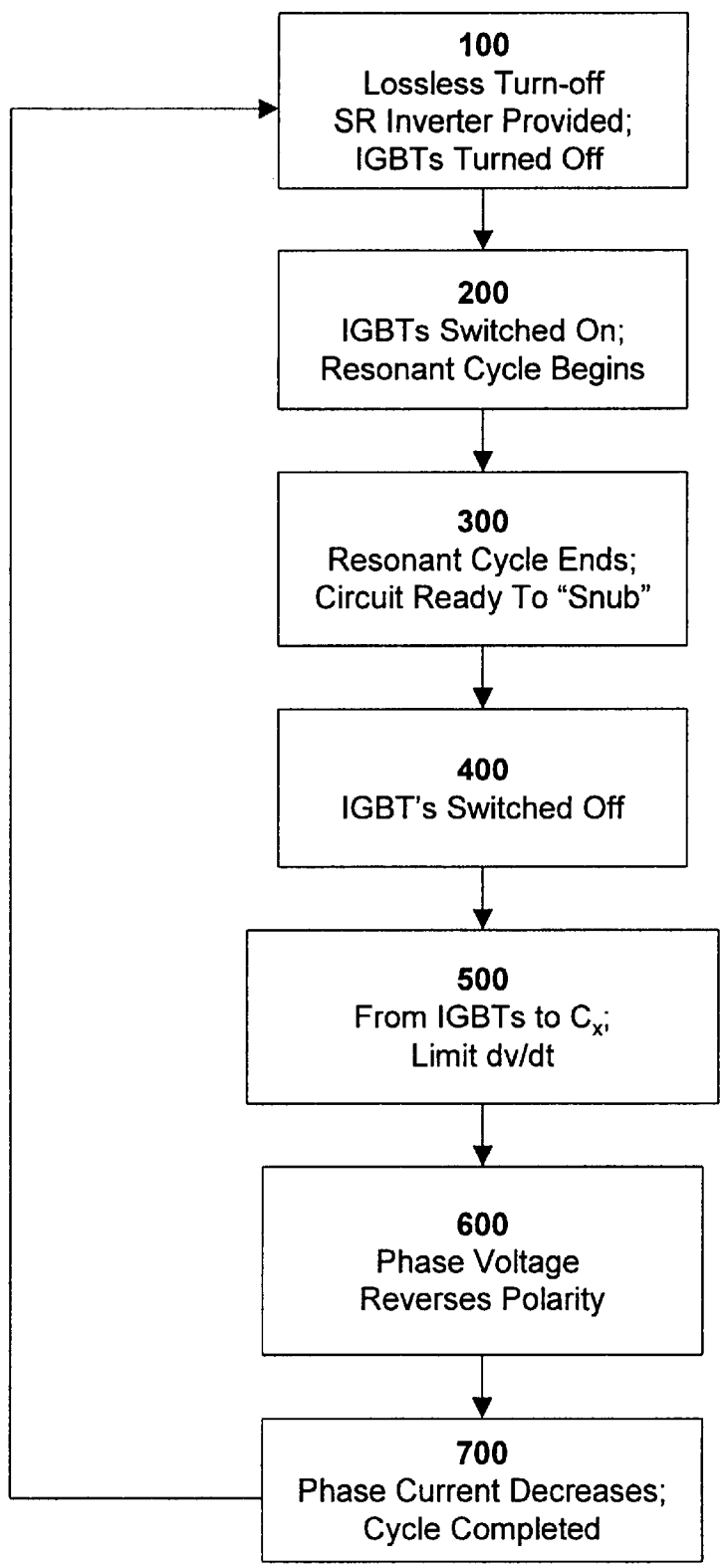
FIG. 8 is a flow chart of a method of reducing turn-off loss in a switched reluctance motor drive, in accordance with the present invention.

Referring to FIGS. 6–8, the following description explains the operation of a switched reluctance motor drive using the SR inverter 60, in accordance with the present invention, over a full switching cycle. For purposes of illustrating this embodiment of the present invention, a few assumptions are made. First, it is assumed that the phase current, $I_{ph}$, and the phase inductance, are sufficiently large such that the SR inverter 60 is in a continuous conduction mode. Second, conduction drops across switches 91, 93, which are preferably Insulated Gate Bipolar Transistors (IGBTs), and diodes 62, 64, 66, 68 are assumed to be negligible. Third, the SR inverter 60 is assumed to be in the "hard chopping" mode. Fourth, phase inductance is assumed to be constant, and SR motor 10 back emf is assumed to be less than $V_{DC}$ and constant during a particular switching cycle. Finally, $d_{S1}$ and $d_{S2}$ represent the applied gate control signals to switches 91, 93, respectively.

Between times $t_0$ and $t_1$, both switches 91, 93 are turned off. This preliminary step is illustrated in Block 100 in FIG. 8. Accordingly and as a result, the applied phase voltage across the motor winding, $V_{ph}$, is equivalent to the negative bus voltage, $-V_{DC}$. Additionally, the current in the phase winding, $I_{ph}$, is freewheeling through diodes 62, 64, and is slowly decreasing. Finally, capacitor, Cx, 72 is initially charged to $+V_{DC}$.

At time $t_1$, switches 91, 93 are turned on. This step is illustrated in Block 200 of FIG. 8. Accordingly and as a result, the phase voltage across the motor winding, $V_{ph}$, changes from negative $V_{DC}$ to positive $V_{DC}$. Additionally, the phase current, $I_{ph}$, during this interval is slowly increasing in a linear fashion. Also at time $t_1$, the cathode of diode 68 is pulled to $-V_{DC}$. Pulling this voltage to the negative sets up a half-cycle resonance between inductor, Lx, 70 and capacitor, Cx, 72. The inductor current, $I_{Lx}$ in inductor, Lx, 70 resonates in a sinusoidal fashion until one-half of a cycle is reached. At this point, diode 68 prevents the inductor current, $I_{Lx}$, from going negative. Additionally, capacitor voltage, $V_{Cx}$, while resonating with inductor, Lx, 70, changes from positive $V_{DC}$ to negative $V_{DC}$.

At the end of the resonant cycle, at time $t_2$, the voltage across capacitor, Cx, 72 is charged to the same value as the phase winding voltage, $V_{ph}$. The SR inverter 60 is now ready to "snub" switches 91, 93 when they are turned off, thus reducing turn-off loss in the SR inverter 60. Between times $t_2$ and $t_3$, the added components are inactive, the voltage applied across capacitor, Cx, 72, $V_{Cx}$, is constant and the inductor current, $I_{Lx}$, is zero. Additionally, the phase current, $I_{ph}$, is increasing linearly. This is illustrated in Block 300 of FIG. 8.

At time $t_3$, switches 91, 93 are turned off. This is illustrated in Block 400 of FIG. 8. Due to capacitor, Cx, 72, the voltage across switches 91, 93 cannot rise instantly. Diode 66 becomes forward biased, and part of the phase current, $I_{ph}$, flows through capacitor, Cx, 72 and diode 66. The dv/dt (i.e., the rate of change of voltage) across the phase winding and the switches may be determined by the size of capacitor, Cx, 72. At this point, if the phase inductance is relatively large, the phase current, $I_{ph}$, is nearly constant during this interval. The value of the capacitor, Cx, 72 is selected such that the dv/dt across switches 91, 93 forces the collector-to-emitter voltages, $V_{ce-S1}$ and $V_{ce-S2}$, to remain fairly low while switches 91, 93 turn off at time $t_3$.

Between times $t_3$ and $t_4$, the voltage across each switch 91, 93 increases at a linear rate while the phase current, $I_{ph}$, is diverted from switches 91, 93 to capacitor, Cx, 72. This reduces the turn-off losses in switches 91, 93 significantly. This is illustrated in Block 500 of FIG. 8.

At time $t_4$, the phase voltage, $V_{ph}$, has reversed polarity and the free-wheeling diodes 62, 64 have become forward biased. This clamps the phase voltage at negative $V_{DC}$. This is illustrated in Block 600 of FIG. 8.

Between times $t_4$ and $t_5$, the phase voltage, $V_{ph}$, is negative, and the phase current, $I_{ph}$, has decreased linearly. The components 66, 68, 70, 72 become inactive.

At time $t_5$, the switching cycle has been completed, the turn-off loss has been reduced and the sequence resumes as described above with regards to instance $t_1$. This is illustrated in Block 700 of FIG. 8.

In another embodiment of the present invention, there is provided a method of reducing acoustic noise and switching losses in SR motor drive 61, operated in single pulse mode. In this embodiment, the inverter can be referred to as a soft-commutation SR inverter. That is, the circuit as disclosed above may also be used to slow down the change in voltage (dv/dt), as applied to the phase winding 36 at a turn-off commutation point. This results in reduced acoustic noise and switching losses.

Figure 11:
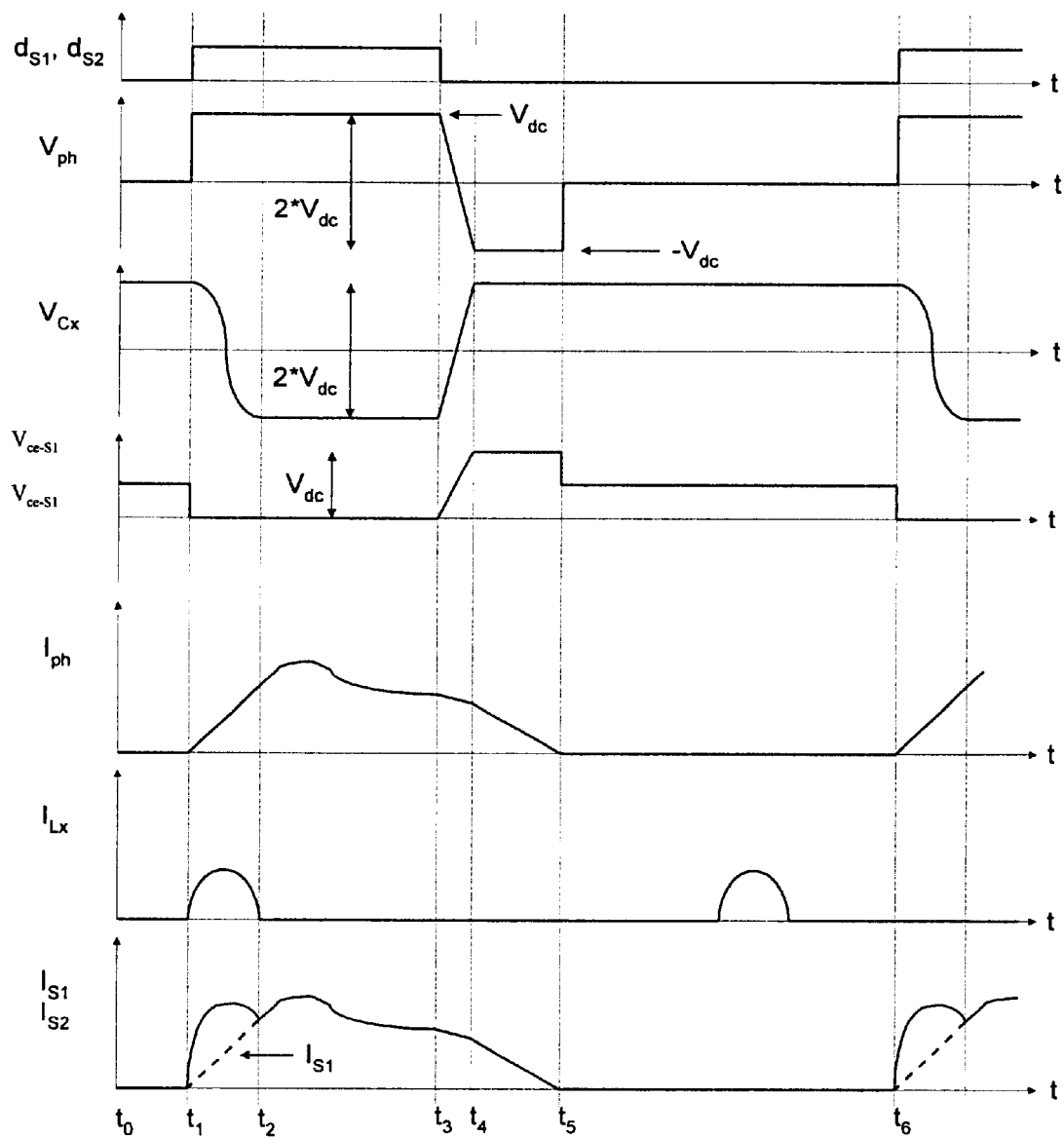
FIG. 11 illustrates another graph of exemplary waveforms resulting from the switched reluctance inverter of FIG. 6 operating in single pulse mode when designed for acoustic noise reduction.

FIG. 11 illustrates the waveforms resulting from soft-commutation SR inverter 60 of FIG. 6. Finally, FIG. 12 illustrates a block diagram of a method of reducing acoustic noise and switching losses in a switched reluctance motor drive, in accordance with the present invention.

Figure 12:
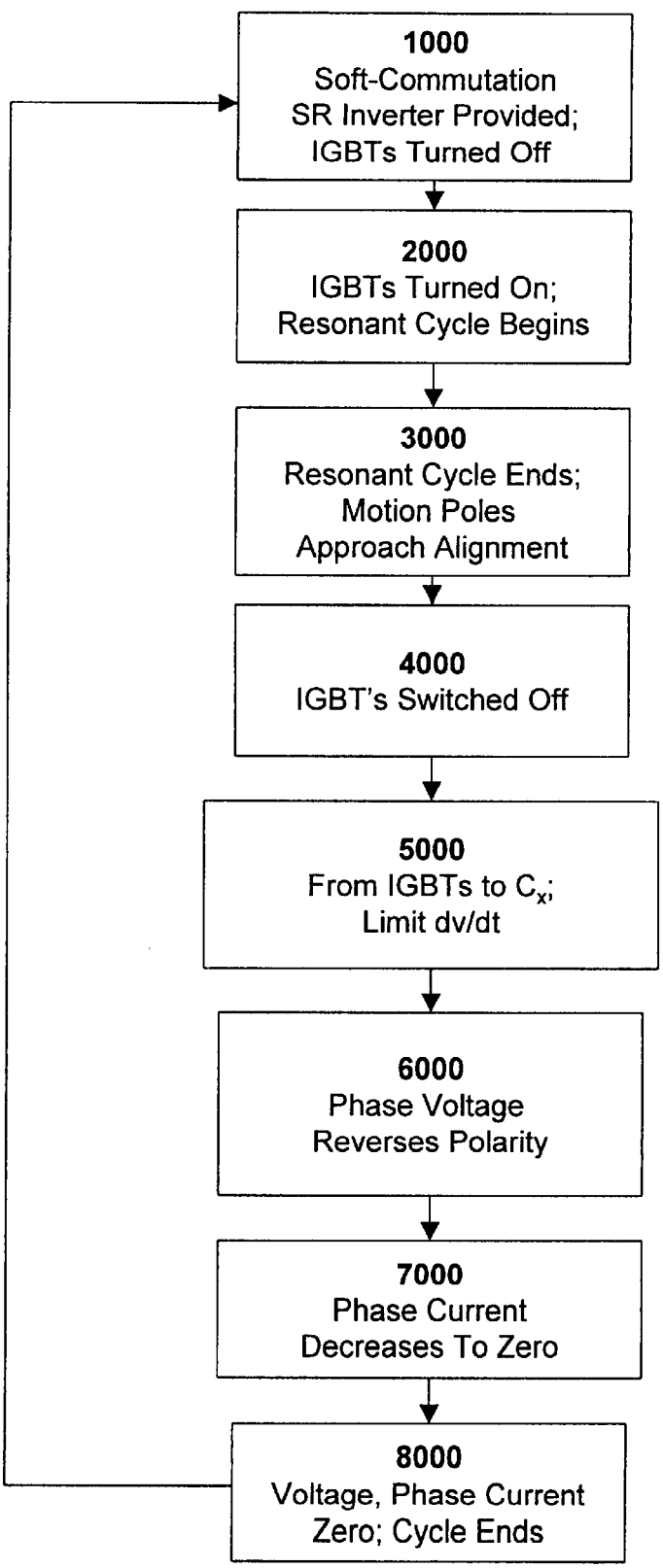
FIG. 12 is a flow chart of a method of reducing acoustic and switching noise in a switched reluctance motor drive in accordance with the present invention.

Referring to FIGS. 6 and 11–12, the following description explains the operation of a method of reducing acoustic and switching noise in a switched reluctance motor drive using soft-commutation SR inverter 60, in accordance with the present invention, over a full switching cycle. For purposes of illustration, two assumptions are made. First, conduction drops across switches 91, 93, which are preferably Insulated Gate Bipolar Transistors (IGBTs), and diodes 62, 64, 66, 68 are assumed to be negligible. Second, the SR inverter 60 is assumed to be in the "single pulse" mode. Finally, $d_{S1}$ and $d_{S2}$ represent the applied gate control to switches 91, 93, respectively.

Referring to FIG. 11, between times $t_0$ and $t_1$, both switches 91, 93 are turned off. This preliminary step is illustrated in Block 1000 in FIG. 12.

Accordingly and as a result, the applied phase voltage across the motor winding, $V_{ph}$, is zero, as is the current in the phase winding, $I_{ph}$. The capacitor, Cx, 72 is initially charged to $+V_{DC}$.

Time instant $t_1$ is the turn-on commutation point. Thus, at time $t_1$, switches 91, 93 are turned on. This step is illustrated in Block 2000 of FIG. 12. The phase voltage across the motor winding, $V_{ph}$, changes from zero to positive $V_{DC}$. Additionally, the phase current, $I_{ph}$, during this interval is quickly increasing in a linear fashion. This is due to the low phase inductance. Also at time $t_1$, the cathode of diode 68 is pulled to $-V_{DC}$. Pulling this voltage negative sets up a half-cycle resonance between inductor, Lx, 70 and capacitor, Cx, 72. The inductor current, $I_{Lx}$, in inductor, Lx, 70 resonates in a sinusoidal fashion until ½ of a cycle is reached. At this point, diode 68 prevents the inductor current, $I_{Lx}$, from going negative. Additionally, capacitor voltage, $V_{Cx}$, while resonating with inductor, Lx, 70, changes from positive $V_{DC}$ to negative $V_{DC}$.

At the end of the resonant cycle, at time $t_2$, the voltage across capacitor, Cx, 72 is charged to the same value as the phase winding voltage. The soft-commutation SR inverter 60 is now ready to limit the dv/dt at the turn-off commutation point.

Between times $t_2$ and $t_3$, the motor poles begin to overlap an approaching alignment. Additionally, at this point, the motor back emf is greater than the input voltage. As a result, the phase current, $I_{ph}$, is decreasing. Additionally, $V_{Cx}$ is constant and $I_{Lx}$ is zero. This is illustrated in Block 3000 of FIG. 12. Time instant $t_3$ is the turn-off commutation point. Thus, at time $t_3$, switches 91, 93 are turned off. This is illustrated in Block 4000 of FIG. 12. Due to capacitor, Cx, 72, the voltage across switches 91, 93 cannot rise instantly. Diode 66 becomes forward biased, and part of the phase current, $I_{ph}$, flows through capacitor, Cx, 72 and diode 66. Preferably, the dv/dt (i.e., the rate of change of voltage) across the phase winding and the switches may be determined by the size of capacitor, Cx, 72. Capacitor, Cx, 72 is selected such that the dv/dt across the winding achieves the desired dv/dt and reduction in acoustic noise.

Additionally at time $t_3$, stator vibration will be excited. Due to the relatively large value of capacitor, Cx, 72, the collector-to-emitter voltage, $V_{ce-S1}$ and $V_{ce-S2}$, remain fairly low while switches 91, 93 are turned off. This reduces the turn-off losses in switches 91, 93 significantly. This is illustrated in Block 5000 of FIG. 12.

At time $t_4$, the phase voltage, $V_{ph}$, has reversed polarity and the freewheeling diodes 62, 64 have become forward biased. This clamps the phase voltage at negative $V_{DC}$. This is illustrated in Block 6000 of FIG. 12.

Between times $t_4$ and $t_5$, the phase voltage, $V_{ph}$, is negative, and the phase current, $I_{ph}$, continues to decrease. At time $t_5$, the phase current reaches zero. This is illustrated in Block 7000 of FIG. 12.

Between times t5 and t6, the phase current, $I_{ph}$, and the voltage, $V_{ph}$, are both zero. The cycle ends at time instant $t_6$. This is illustrated in Block 8000 of FIG. 12.

The snubber circuit components shown in dashed box 65 of SR inverter 60, as illustrated in FIG. 6, are preferably chosen in accordance with the following parameters. Capacitor, Cx, 72 may be preferably selected to provide the desired rate of change of voltage (dv/dt) across switches 91, 93, as shown in Equation ("Eq.") 1. The time period between $t_3$ and $t_4$ is defined as $t_{off}$.

$$C_X = \frac{I_{ph} * t_{off}}{2 * V_{DC}} \quad \text{(Eq. 1)}$$

Next, the inductance of inductor, Lx, 70 is selected to provide the desired reset time, as seen in Eq. 3. The reset time, $t_{reset}$, is defined as the interval from $t_1$ to $t_2$, and is calculated in Eq. 2. The shorter this period, the smaller the inductor, Lx, 70 will be. However, a smaller inductor, Lx, 70 results in a larger peak current in the inductor, Lx, 70, diode 66 and switch 93 during reset, so a trade-off is made between a short reset time and peak current stress. Also, if the switch on time is less than the reset time, the SR inverter 60 will not fully reset, and turn-off loss will increase.

$$t_{reset} = \pi * \sqrt{L_X * C_X} \quad \text{(Eq. 2)}$$

$$L_X = \frac{1}{C_X} * \left(\frac{t_{reset}}{\pi}\right)^2 \quad \text{(Eq. 3)}$$

Finally, the peak inductor current is calculated to determine the stresses as shown in Eq. 4.

$$I_{Lx-peak} = \frac{V_{DC}}{Z_0} = V_{DC} * \sqrt{\frac{C_X}{L_X}} \quad \text{(Eq. 4)}$$

As an example, consider an inverter with $V_{dc}$=350 Volts and a 200 Ampere peak phase current. To reduce the switch turn-off loss, a $t_{off}$ time is set at 2 $\mu$sec. According to Eq. 1, the calculated Cx will be 0.56 $\mu$F. A reset time from Eq. 2 of 10 $\mu$sec was selected, which resulted in Lx=18.1 $\mu$H from Eq. 3. Finally, the peak current in the resonant inductor was calculated from Eq. 4 as 62 Amperes. The component size and rating for the snubber circuit is relatively small considering the 350V, 200A operation of the inverter. Diodes 66, 68 may preferably be 1200 Volt, 30 Ampere diodes, since the average current through the diodes is a fraction of the 62 Ampere peak. Preferably, Cx could be a 600 Volt polypropylene capacitor.

Figure 9:
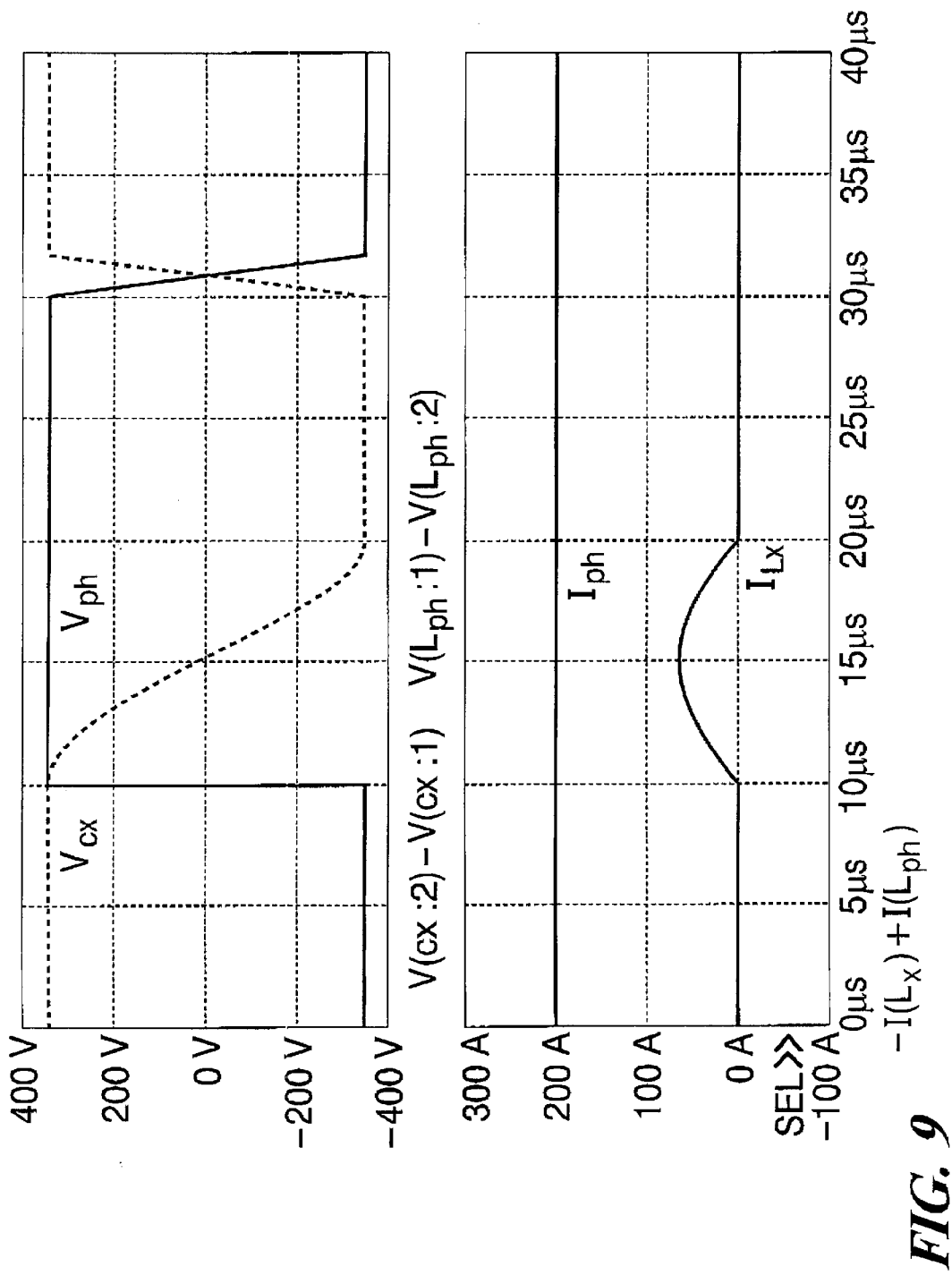
FIG. 9 illustrates a graph of exemplary phase waveforms (voltage and current), resonant capacitor voltage and resonant inductor current of the switched reluctance inverter of FIG. 6.
Figure 10:
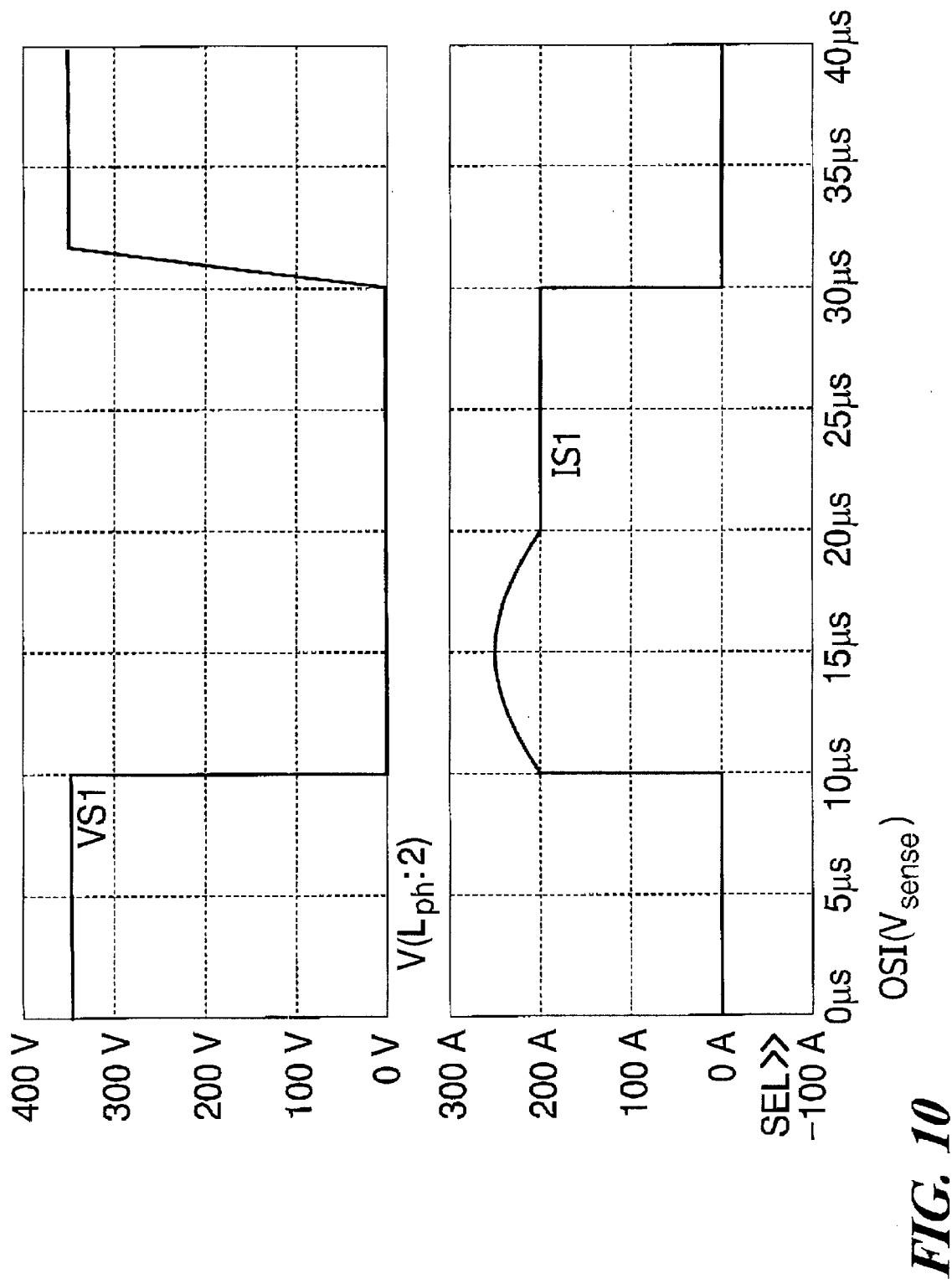
FIG. 10 illustrates a graph of exemplary switch collector-to-emitter voltage and collector current of the switched reluctance inverter of FIG. 6.

In the example described above, the switch on time was set to 20 $\mu$sec, and the phase inductance was 1 mH. All other parameters were set as in the above example. FIG. 9 illustrates the phase waveforms (for both voltage and current), and the resonant capacitor voltage and resonant inductor current. FIG. 10 shows the switch collector-to-emitter voltage and collector current. Note that the reset cycle takes 10 $\mu$sec to complete, with a peak current of 62 Ampere. From FIG. 10, the turn-off rise time of the switch voltage is 2 $\mu$sec.

It should be appreciated that the embodiments described above are to be considered in all respects only illustrative and not restrictive. The scope of the present invention is indicated by the following claims rather than by the foregoing description. All changes that come within the meaning and range of equivalents are to be embraced within their scope.

We claim:

1. An inverter for use with an electric motor, comprising:
   a first transistor having a first node for connecting to a power supply and a second node for connecting to a phase winding;
   a second transistor having a first node for connecting to the power supply and a second node for connecting to the phase winding;

a first diode having a first node and a second node, wherein the second node of the first diode is connected to the second node of the first transistor;

a capacitor connected between the first node of the first diode and the second node of the first transistor;

a second diode having a first node and a second node, wherein the second node of the second diode is connected to the first node of the first diode; and an inductor connected to the first node of the second diode.

2. The inverter of claim 1, further comprising:

a freewheeling diode connected to the second node of the first transistor.

3. The inverter of claim 1, further comprising:

a freewheeling diode connected to the second node of the second transistor.

4. The inverter of claim 1, wherein the first and second transistors are insulated gate bipolar transistors.

5. A method of reducing turn-off loss in a switched reluctance motor drive, comprising:

providing a switched reluctance inverter including a pair of insulated gate bipolar transistors coupled to a phase winding, the switched reluctance motor further including a capacitor operatively coupled to the pair of insulated gate bipolar transistors;

charging the capacitor while the pair of insulated gate bipolar transistors are turned on; and limiting a rate of change of a voltage across a first insulated gate bipolar transistor of the pair of insulated gate bipolar transistors according to a capacitance value of the capacitor while the pair of insulated gate bipolar transistors are turned off.

6. The method of claim 5, further comprising:

providing an inductor coupled to the capacitor; and resonating a voltage applied to the capacitor between the capacitor and the inductor such that the voltage across the capacitor reverses polarity.

7. A method of reducing acoustic and switching noise a switched reluctance motor drive, comprising:

providing a soft-commutation switched reluctance inverter including a pair of insulated gate bipolar transistors coupled to a phase winding, the switched reluctance motor further including a capacitor operatively coupled to the pair of insulated gate bipolar transistors;

charging the capacitor while the pair of insulated gate bipolar transistors are turned on; and limiting a rate of change of a voltage across a first insulated gate bipolar transistor of the pair of insulated gate bipolar transistors according to a capacitance value of the capacitor while the pair of insulated gate bipolar transistors are turned off.

8. The method of claim 7, further comprising:

providing an inductor coupled to the capacitor; and resonating a voltage applied to the capacitor between the capacitor and the inductor such that the voltage across the capacitor reverses polarity.

* * * * *